(12) United States Patent
Ashcraft

(10) Patent No.: US 6,413,644 B2
(45) Date of Patent: *Jul. 2, 2002

(54) THIN FILM STRUCTURES FOR AND METHOD OF SEALING TO GLASS

(75) Inventor: Charles Ray Ashcraft, Winston-Salem, NC (US)

(73) Assignee: R.J. Reynolds Tobacco Company, Winston-Salem, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/813,961

(22) Filed: Mar. 3, 1997

(51) Int. Cl.[7] .................. B32B 17/10; B65D 43/00; B65B 7/28; C09J 5/06
(52) U.S. Cl. ............ 428/441; 428/34.7; 428/36.6; 428/461; 428/475.8; 428/483; 428/511; 428/515; 220/359.4; 156/69; 156/327
(58) Field of Search .................. 428/461, 475.8, 428/483, 507, 511, 515, 36.6, 34.4, 34.7, 441, 442; 220/359.1, 359.4; 156/69, 327

(56) References Cited

U.S. PATENT DOCUMENTS

| | | | | |
|---|---|---|---|---|
| 4,442,129 A | * | 4/1984 | Niwa et al. ............ 426/399 |
| 4,460,632 A | * | 7/1984 | Adur et al. ............ 428/35 |
| 4,481,262 A | * | 11/1984 | Shida et al. ............ 428/441 |
| 4,686,133 A | | 8/1987 | Nakabayashi et al. ...... 428/209 |
| 4,792,484 A | | 12/1988 | Moritani ............ 428/323 |
| 4,857,409 A | | 8/1989 | Hazelton et al. ............ 428/494 |
| 4,915,289 A | * | 4/1990 | Hatano et al. ............ 229/123.1 |
| 4,921,907 A | | 5/1990 | Negi et al. ............ 525/57 |
| 4,977,004 A | | 12/1990 | Bettle, III et al. ...... 428/36.7 |
| 4,982,872 A | | 1/1991 | Avery ............ 220/461 |
| 5,079,051 A | | 1/1992 | Garland et al. ............ 428/34.9 |
| 5,105,957 A | * | 4/1992 | Manni ............ 215/32 |
| 5,106,688 A | | 4/1992 | Bradfute et al. ............ 428/215 |
| 5,175,036 A | | 12/1992 | Smiley et al. ............ 428/36.7 |
| 5,407,713 A | | 4/1995 | Wilfong et al. ............ 428/34.1 |
| 5,496,295 A | | 3/1996 | Wilfong et al. ............ 604/332 |

FOREIGN PATENT DOCUMENTS

| | | |
|---|---|---|
| FR | EP 0 615 838 A1 | 9/1994 |
| JP | XP-02122909 | 9/1985 |
| JP | XP-002122908 | 8/1988 |

OTHER PUBLICATIONS

Gauthier, Michelle M., Engineered Materials Handbook, p. 92, Nov. 1995.*
Communication from EPO dated Nov. 26, 1999 (3 pages).

* cited by examiner

Primary Examiner—D. S. Nakarani
Assistant Examiner—Holly C. Rickman

(57) ABSTRACT

A sealing film and a method of sealing the film to glass is disclosed. The film comprises a layer of ethylene vinyl alcohol (EVOH) or a laminate comprising an outermost ethylene vinyl alcohol (EVOH) layer for adhering to a glass surface, particularly the rim of a glass container, using heat and pressure. The laminate may include in addition to the EVOH layer an adhesive layer, polymeric layer, optional adhesive layer and stock layer. The film has excellent adhesive properties, is food safe and is suitable as a sealing material.

16 Claims, 1 Drawing Sheet ing a rubber
THIN FILM STRUCTURES FOR AND METHOD OF SEALING TO GLASS

FIELD OF THE INVENTION

The present invention relates to the use of single and multi-layer films or foils containing an adhesive comprising ethylene vinyl alcohol (EVOH) to adhere to and securely seal glass containers such that the seals will remain intact under storage conditions of high temperature and humidity.

BACKGROUND OF THE INVENTION

The use of ethylene vinyl alcohol (EVOH) as an oxygen barrier layer in film laminates especially as part of a barrier layer in food packaging is well known in the art. Typically, the laminate is in the form of an inner moisture barrier layer, an adhesive layer, EVOH, another adhesive layer and an outer moisture barrier layer. It is usually necessary for the laminate to have this structure so as to maintain the EVOH layer dry since the EVOH will not act as an oxygen barrier once exposed to water. The sealant layer in such laminates must also function as a barrier to the product to keep components of the product from wicking through the sealant layer and adversely affecting the sealant bond and to prevent those components from adversely affecting other lamination bonds of a multi-layer material or the graphics of a printed laminate material. When EVOH is used as an oxygen and moisture barrier layer as in the prior art, product components can still migrate into the layers positioned between the product and the EVOH layer. Similarly, polymeric components of the sealant and adhesive layers may migrate from those layers into the product.

The use of EVOH films in contact with food products are known. One example of a laminate barrier structure for a food container having an inner layer of EVOH in contact with the food is disclosed in U.S. Pat. No. 4,997,004. That patent describes a multi-layer barrier structure having a layer of EVOH next to the food, an adhesive layer, a moisture barrier layer, a further EVOH layer and another moisture barrier layer. The laminate is either applied to cardboard stock to make a carton or used as part of a plastic carton. The use of EVOH films in contact with food products are known. One example of a laminate barrier structure for a food container having an inner layer of EVOH in contact with the food disclosed in U.S. Pat. No. 4,997,004. That patent describes a multi-layer barrier structure having a layer of EVOH next to the food, an adhesive layer, a moisture barrier layer, a further EVOH layer and another moisture barrier layer. The laminate is either applied to cardboard stock to make a carton or used as part of a plastic carton. The patent discloses that the EVOH layer next to the food precents "scalping" of flavor by absorption of essential oils from the food. The EVOH layer between the mousture barrier layers is used as an oxygen barrier to prevent oxygen from entering the package. The patent discloses that the EVOH layer next to the food prevents "scalping" of flavor by absorption of essential oils from the food. The EVOH layer between the moisture barrier layers is used as an oxygen barrier to prevent oxygen from entering the package.

It is well known that if an EVOH layer is used as an oxygen barrier, the EVOH layer must be kept in an anhydrous state to maintain the effectiveness of the oxygen barrier. U.S. Pat. No. 4,792,484, describes the use of a granular drying agent in a layer of EVOH to maintain the anhydrous state. The EVOH can then be used as the oxygen barrier layer in a multi-layer package and especially as part of a multi-layered film useful in packaging retorted food.

U.S. Pat. Nos. Re. 32,927; 4,632,271; and 4,793,510 disclose a metal can with a resealable top having a rubber gasket as part of the sealing element. The rubber gasket is disclosed as having a surface coating of waxes and lacquers to improve compatibility and sealability with the metal surface. Polyvinylidene chloride (PVDC) or ethylene vinyl alcohol (EVOH) are suggested for reducing gas transmission if necessary.

SUMMARY AND OBJECTIVES OF THE INVENTION

The present invention relates to the use of ethylene vinyl alcohol films as an adhesive to glass surfaces. Such films can be incorporated in laminates with various physical properties according to the different layers of the laminate. The use of ethylene-vinyl alcohol films as an adhesive is particularly advantageous because the films are non-tacky and easy to handle compared with normal food grade adhesives.

A primary objective of the invention is to provide a novel laminate film that can be heat and pressure sealed to a glass container using a food grade adhesive. The adhesive film is intended to be used as a inner layer, or safety sealing layer, for glass food containers, such as open-mouthed glass jars. The film adhesive layer not only withstands moisture, but also the elevated temperatures associated with the shipping and warehousing of canned foods without failure. This is accomplished according to the invention by the use of a saponified ethylene vinyl acetate copolymer composition (referred to hereinafter as EVOH) wherein at least one EVOH layer is adjacent to the rim or lip of the glass container to be sealed.

A further object of the invention is to provide a laminate film wherein the film layer adjacent to the glass functions as an adhesive to securely and safely seal the laminate film to the glass.

A further objective of the invention is to provide a laminate film that can be used as an adhesive label for labeling glass containers and to thus avoid the use of liquid or other types of label adhesives.

With the foregoing and other objects, advantages and features of the invention that will become hereinafter apparent, the nature of the invention may be more clearly understood by reference to the following detailed description of the invention, the appended claims and to the several views illustrated in the drawings.

DETAILED DESCRIPTION OF THE INVENTION

A number of different known adhesive materials were used for sealing a laminate to glass without obtaining acceptable adhesion to the glass. In a series of experiments, many of the known adhesive materials adhered well to glass at room temperature but failed during high temperature and high humidity storage conditions. Some of the tested materials include hot melts such as ethylene vinyl acetate with a vinyl acetate content of 18 to 33 percent and a melt index of 2 to 500 at levels between 10 and 50 percent; polyethylene with a melt index of 1 to 2000 at levels between 15 and 75 percent; Surlyn® resin with a melt index of 2 to 15 at levels between 10 and 25 percent; waxes such as fully refined paraffin, micro crystalline wax, synthetic waxes, polyethylene, and oxidized waxes with the waxes having melting points from 150 to 230° F. at levels between 20 and 40 percent; and tackifiers such as rosin esters, hydrocarbons, α-methyl styrene and α-methyl styrene-vinyl toluene copolymer at levels between 10 and 55 percent. Extruded films from the following resins were also unsuccessfully tried as laminate adhesives to glass containers: a resin compounded from the blend of ethylene vinyl acetate with a vinyl acetate composition of 25 percent and a melt index of 2 with polybutylene and α-methyl styrene and Surlyn® resins 1605 and 1652. In addition, a Morton water based emulsion was also unsuccessful as a laminate adhesive to glass.

It was, however, unexpectedly discovered that a laminate with an ethylene vinyl alcohol film adhesive layer can be heat sealed to glass using heat and pressure and that this film will adhere to the glass surprisingly even under conditions of high heat and humidity. It is also contemplated that an EVOH film alone may be used to seal the opening or mouth of a glass container.

The laminate films of the invention can be used as an inner, tamper-evident sealing layer for the rim of a glass jar that is used under a metal screw cap for the jar. When used as the inner layer that is adhesively sealed to the glass, the portion of the layer that is not actually sealed to the glass is in contact with the food. Ethylene vinyl alcohol has the distinct advantage that it is a food grade polymer and can therefore come in contact with foods during storage. The laminate film of the invention can also be used as a label for sealing to glass surfaces of any type, but especially to glass containers.

Figure 1:
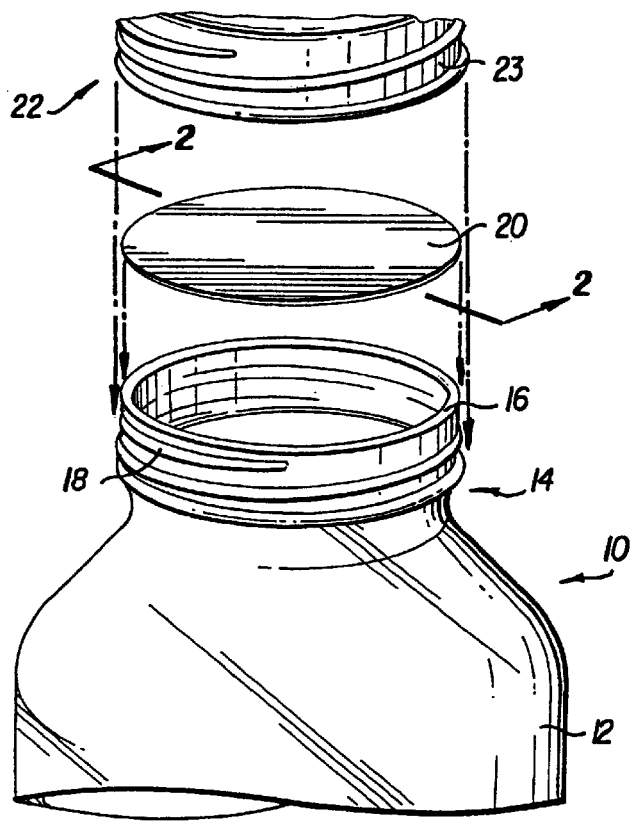
FIG. 1 is an exploded, fragmentary perspective view of the thin film laminate of the present invention used as a sealing laminate film for the rim of a glass container.

Referring now to FIG. 1, there is shown a conventional glass container or jar which may be a food container and which is designated generally by reference numeral 10. Container 10 has a body 12 for containing a food product, e.g., mayonnaise, and a neck 14 which terminates in an upwardly open, circular mouth having an annular rim or lip 16. Neck 14 has a thread 18 which is typically molded into the neck 14 when the glass container 10 is formed. A laminate film 20 made according to the present invention is sealed by heat and pressure to the rim 16 of the glass container as described in more detail hereinafter. A metal or plastic lid 22 with a threaded skirt 23 is threaded onto the threads 18 of neck 14 to enclose and protect the laminate film 20.

Figure 2:
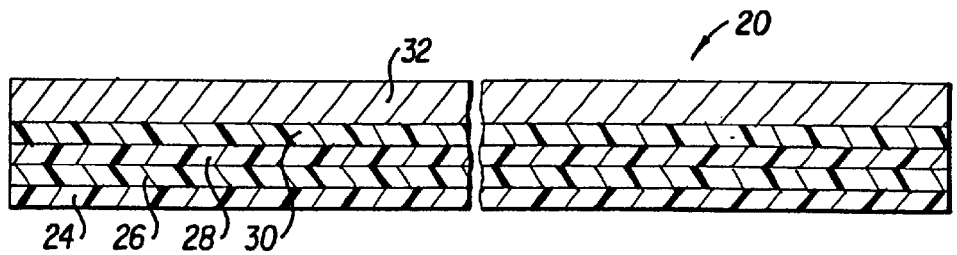
FIG. 2 is an enlarged cross-sectional view of the thin film laminate of the present invention taken along line 2—2 of FIG. 1.

FIG. 2 illustrates a cross-section of the laminate film 20 of FIG. 1 which comprises an outermost ethylene vinyl alcohol layer 24 which directly contacts and adheres to the glass surface of rim 16, an adhesive or tie layer 26 to tie or bond the ethylene vinyl alcohol layer 24 to a polymer layer 28. The polymer layer 28 provides structural strength to the laminate film 20 and, if desired or required, can be adhesively bonded by a further adhesive layer 30 to a stock layer 32. The polymer layer 28 may comprise any polyolefin, for example, high density polyethylene (HDPE), low density polyethylene (LDPE), linear low density polyethylene, polypropylene, and polyethylene-polypropylene copolymers. The polymer layer can also comprise other polymers such as ethylene acrylic acid, polyesters such as polyethylene terephthalates, polyamides such as nylon, ionomers, such as Surlyn® sold by DuPont, and rubbers. The stock layer may comprise any number of materials with the choice of materials being determined by the end use of the laminate films. Typical, stock layers include paperboard, cardboard, and metal foils. If a label is desired, the stock layer may be paper or foil with the label indicia printed thereon. If a more substantial laminate film capable of excluding oxygen is desired, a stock layer comprising layers of ethylene vinyl alcohol and polyolefin can be used wherein the ethylene vinyl alcohol is sandwiched between the polyolefin layers so that the ethylene vinyl alcohol remains dry and thus capable of excluding oxygen. It should be understood that those portions or layers of the laminate film 20 bonded to the outermost EVOH adhesive sealing layer 24 may comprise many other combinations of films, foils and adhesive layers without departing from the scope of the present invention. It should also be understood that the EVOH layer 24 alone may be used to seal the rim 16 of the bottle mouth.

Figure 3:
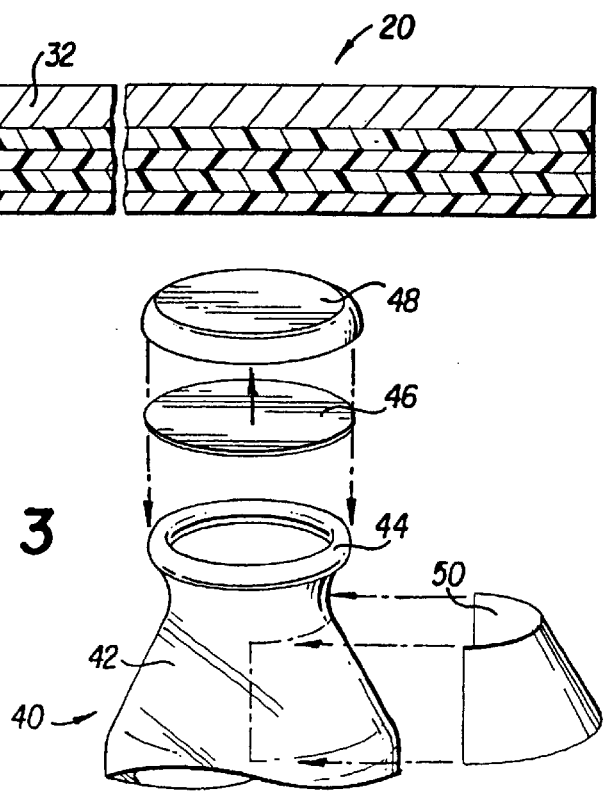
FIG. 3 is an exploded, fragmentary perspective view of an alternative embodiment of the thin film laminate of the present invention used as a sealing laminate film for the rim of another type of glass container and as a container label.

An alternative embodiment for a glass bottle stopper is shown in FIG. 3 in which a glass bottle 40 having a tapered neck 42 and a mouth with an annular rim 44 is sealed with a laminate 46 made according to the invention. A plastic stopper or cap 48 is secured over the laminate 46 by conventional means. The laminate 46 has a layer of ethylene vinyl alcohol similar to layer 24 adjacent the rim 44 of the mouth of glass bottle 40. The EVOH layer may alternatively be bonded to the cap 48 and sealed to the rim 44 by heat and pressure when the cap is applied to the bottle.

In a further embodiment of the invention, an EVOH film/laminate is heat sealed to the glass bottle opening. Thereafter, a plastic shrink wrap material is applied over the EVOH film at the bottle opening. The heat shrink material is then heated so that it shrinks to enclose the EVOH layer and the bottle opening. The combination of heat and pressure from the shrink wrap does not adversely affect the EVOH seal and may improve the seal to the glass.

FIG. 3 also illustrates another application of the laminate film of the present invention. A label laminate film 50, which may have a structure similar to that shown in FIG. 2 including an EVOH layer corresponding to layer 24, may be bonded by heat and pressure to a surface of the glass bottle 40, in this case, the tapered neck 42 of the bottle. The printed indicia layer of label 50 may correspond to the outer stock layer 32 of the laminate film and may be a printed foil or printed paper layer.

The laminate film of the present invention may be made by a variety of techniques well-known in the art, but preferably by the lamination of the ethylene vinyl alcohol sealant layer to the stock or substrate layer. The lamination can occur by extrusion coating the stock layer with an adhesive layer and while keeping the adhesive at a suitable temperature applying the ethylene vinyl alcohol layer to the adhesive layer using standard extrusion coating techniques. Alternatively, the adhesive layer and the ethylene vinyl alcohol layer can be coextruded onto the stock layer again using techniques well known in the art. A variety of different adhesives can be used and the temperatures of application will depend on the adhesive and the stock layers. For example, the following adhesive compounds and application temperatures can be used: modified polypropylene (400–500° F.), ethylene acrylic acid copolymer (350–400° F.), modified ethylene vinyl acetate copolymer (350–450° F.) and modified polyethylene (350–450° F.).

The laminated film of the invention can also be made by gravure application of the adhesive to the stock layer, partially curing the adhesive, then laminating the ethylene vinyl alcohol to the stock layer by compression between two nip rollers followed by final curing of the adhesive by heat, radiation or time. The adhesives that can be used in the gravure application include urethanes, acrylics and polyethyleneimine.

Ethylene vinyl alcohol can also be extrusion coated onto a compatible surface, for example, paper, metal foil or polymeric film. Typical extrusion temperatures are 325 to 400° F. A primer may be required to ensure adequate adhesion of the ethylene vinyl alcohol layer to the stock layer. The primer may be preapplied to the stock layer so that the coating is similar to the gravure lamination using the same adhesive. Alternatively, the ethylene vinyl alcohol can be coextruded with a polymer layer that can function as a primer.

The ethylene vinyl alcohol may also be coextruded with an adhesive and a polyolefin layer to form the laminate film. The film can then be oriented by conventional techniques such as forming a bubble so that the film can be basal oriented, stretching the film on a stender frame again for biaxial orientation, or stretching the film with nip rollers to achieve an axial orientation.

The following examples are provided in order to further illustrate various embodiments of the invention but should not be construed as limiting the scope thereof.

EXAMPLE 1

A laminate foil was prepared from the lamination of a 1.25 mil film onto a 0.001 inch foil/adhesive tape. The film comprised 38 percent ethylene acrylic acid, 24 percent of a polypropylene modified with maleic acid (Plexar 360) made by Quantum Chemical as an adhesive layer and 38 percent ethylene vinyl alcohol (Soarnol ET 3803) made by Nippon Gosi of Japan. The film prepared by coextrusion of the ethylene vinyl alcohol and the other components at a temperature of 325° F. onto a chill roll. The quenched film was not oriented and was then wound onto a roll and slit to the desired size. The thickness of the film was 1.25 mils after extrusion and winding. The extruded film was then coated on to the foil/adhesive tape to form the final laminate foil.

EXAMPLE 2

A laminate foil was prepared in a manner similar to Example 1. The film comprised 38 percent high density polyethylene, 24 percent of a polypropylene modified with maleic acid (Plexar 360) as an adhesive layer and 38 percent ethylene vinyl alcohol (Soarnol ET 3803). The film had a thickness of 1.25 mils after extrusion and winding. This film was then coated onto a .001 inch foil/adhesive tape as in Example 1.

EXAMPLE 3

A laminate foil was prepared in a manner similar to Example 1. The film comprised 53 percent high density polyethylene, 27 percent of a polypropylene modified with maleic acid (Plexar 360) as an adhesive layer and 20 percent ethylene vinyl alcohol (Soarnol ET 3803). The film had a thickness of 1.25 mils after extrusion and winding. This film was then coated onto a 0.001 inch foil/adhesive tape as in Example 1.

EXAMPLE 4

A laminate foil was prepared in a manner similar to Example 1. The film comprised 40 percent high density polyethylene, 20 percent of a polypropylene modified with maleic acid (Plexar 360) as an adhesive layer and 40 percent ethylene vinyl alcohol (Evalca® ECG156) made by the EVAL Company of America. The film had a thickness of 1.25 mils after extrusion and winding. This film was then coated onto a 0.001 inch foil/adhesive tape as in Example 1.

The films made in Examples 1–4 were evaluated for bond strength as shown in Table 1, by sealing the EVOH film laminates to a one inch wide glass slide with heat and pressure using a Sentinal sealer. The sealer temperature varied from 325 to 475° F. with a pressure of 40 psi on the seal bar and a dwell time of 1 second. The samples were aged for 67 hours at room temperature after sealing, then heated to 120° F. and about 15 percent relative humidity. The samples were not allowed to cool before a peel test. The peel test was conducted using an Instron tensile testing device with a jaw speed of two inches per minute and a jaw separation of two inches pulling on the laminate film. The average peel strength of the Examples is shown in Table 1 with the respective sealing temperature. All bond strengths in the following Tables 1–7 are in lb/inch width (pounds per inch width).

TABLE 1

| Seal temp. ° F. | Example 1 | Example 2 | Example 3 | Example 4 |
|---|---|---|---|---|
| 325 | 0.608*** (P)* | 0.331 (P) | 0.504 (P) | 0.671 (P) |
| 375 | 3.000 (P) | 0.935 (P) | 0.908 (P) | 3.261 (D)** |
| 425 | 4.134 (P) | 3.625 (D) | 3.102 (P) | 5.274 (D) |
| 475 | 5.088 (D) | 5.037 (D) | 5.815 (D) | 7.072 (D) |

*(P) means that the laminate peeled from the glass.
**(D) means that the laminate film delaminated between the film and adhesive layer adjacent the metal foil.
***The values given in Table 1 are the average values for the bond strength.

Table 2 illustrates the results of varying the dwell time of the sealer (either 1 or 3 seconds) with the laminate films of Examples 1–4. The samples were aged 67 hours at room temperature then 48 hours at 120° F. and 85 percent relative humidity.

TABLE 2

| Dwell time (sec.) | Example 1 | | Example 2 | | Example 3 | | Example 4 | |
|---|---|---|---|---|---|---|---|---|
| | 1 | 3 | 1 | 3 | 1 | 3 | 1 | 3 |
| 425° F. | 0.299** (P)* | 1.781 (P) | 0.219 (P) | 4.475 (D)* | 0.219 (P) | 2.249 (P) | 1.382 (P) | 2.982 (D) |
| 475° F. | 0.549 (P) | 3.730 (D) | 1.130 (P) | 4.917 (D) | 0.529 (P) | 2.234 (D) | 1.748 (P) | 1.969 (P) |

*See Table 1 definitions.
**The values given in Table 2 are the average values for the bond strength.

Table 3 illustrates peel test results with variable dwell times of the sealer for the laminate films of Examples 1–4. The samples were aged 67 hours at room temperature then immersed in 120° F. water for 24 hours. The test results were not averaged and were conducted as duplicates.

TABLE 3

| Dwell time (sec.) | Example 1 | | Example 2 | | Example 3 | | Example 4 | |
|---|---|---|---|---|---|---|---|---|
| | 1 | 3 | 1 | 3 | 1 | 3 | 1 | 3 |
| 425° F. seal temp | 0.619 (P)* | 3.904 (D)* | 0.000** | 3.320 (D) | 0.000 | 4.037 (D) | 0.646 (P) | 2.676 (D) |
| 425° F. seal temp | 0.077 (P) | 3.914 (D) | 0.210 (P) | 3.043 (D) | 0.680 (P) | 4.111 (D) | 1.268 (P) | 3.097 (D) |
| 475° F. seal temp | 3.765 (D) | 2.564 (D) | 0.104 (P) | 3.049 (D) | 0.000 | 4.058 (D) | 2.990 (D) | 2.750 (D) |
| 475° F. seal temp | 1.291 (P) | 3.953 (D) | 3.038 (D) | 3.700 (D) | 1.803 (P) | 3.025 (D) | 3.150 (D) | 3.236 (D) |

*See Table 1 definitions.
**A value of 0.00 indicates that the sample washed off the slide in the water bath.

EXAMPLE 5

Ethylene vinyl alcohol was extrusion coated onto a 0.001 inch thick foil layer precoated with a tie or adhesive layer. The foil/tie layer was coated at a 15 pound per ream level with Egan® EVOH.

EXAMPLE 6

Ethylene vinyl alcohol was extrusion coated onto a 0.001 inch thick foil layer precoated with a tie or adhesive layer. The foil/tie layer was coated at a 30 pound per ream level with Egan® EVOH.

The extrusion coated films made in Examples 5 and 6 were evaluated for bond strength as shown in Table 4, by sealing the extruded EVOH films to a one inch wide glass slide with heat and pressure using a Sentinal sealer. The temperature used was either 325, 375, 425 or 475° F. with a pressure of 40 psi on the seal bar and a dwell time of 1, 3 or 5 seconds. The samples were aged for 67 hours after sealing at room temperature, then aged for 48 hours at 120° F. and about 15 percent relative humidity. The samples were not allowed to cool before being peel tested. The peel test was conducted using an Instron tensile testing device with a jaw speed of two inches per minute and a jaw separation of two inches pulling on the laminate film. The average peel strength of the Examples is shown in Table 4 with the respective sealing temperature and dwell time.

TABLE 4

| Seal temp. ° F. | Example 5 | | | Example 6 | | |
|---|---|---|---|---|---|---|
| | 1 sec | 3 sec | 5 sec | 1 sec | 3 sec | 5 sec |
| 325 | 1.667* | 4.269 | 4.908 | 4.056 | 6.282 | 5.639 |
| 375 | 5.487 | 3.557 | 4.279 | 4.574 | 4.879 | 4.737 |
| 425 | 4.856 | 4.364 | 4.662 | 5.809 | 3.498 | 3.962 |
| 475 | 3.222 | 1.516 | 4.056 | 5.373 | 3.299 | 0.825 |

*The samples either delaminated between the film and adhesive layer adjacent the foil layer or tore apart into two or more pieces without delamination.

Table 5 illustrates the bond strengths of Examples 5 and 6. The samples were aged for 67 hours after sealing at room temperature, then aged for 48 hours at of the Examples is shown in Table 5 with the respective sealing temperature and dwell time.

TABLE 5

| Seal temp ° F. | Example 5 | | Example 6 | |
|---|---|---|---|---|
| | 1 sec | 3 sec | 1 sec | 3 sec |
| 425 | 3.109 (P)* | 5.543 (D)* | 3.128 (P) | 4.598 (D) |
| 475 | 4.652 (P) | 3.488 (P) | 4.060 (P) | 4.592 (D) |

*See Table 1 definitions.

Table 6 illustrates the adhesive strength of Examples 5 and 6. The samples were aged for 67 hours after sealing at room temperature, then immersed for 24 hours in 120° F. water.

TABLE 6

| Seal temp. ° F. | Example 5 | | Example 6 | |
|---|---|---|---|---|
| | 1 sec | 3 sec | 1 sec | 3 sec |
| 425 | 1.250 (D)* | No sample** | No sample | No sample |
| 475 | 1.832 (D) | No sample | 2.382 (D) | 1.411 (D) |

*See Table 1 definitions.
**The tie layer was not able to maintain integrity under the sealing temperatures for these samples.

EXAMPLE 7

A laminate foil was prepared by extrusion coating ethylene acrylic acid (Nucrel 0910HS) a tie layer (Bynel 4288) and EVOH (Egan ECG156B, old EVOH) onto a 0.001 inch foil layer at 20 pounds per ream, at 30 pounds per ream and at 40 pounds per ream.

EXAMPLE 8

A laminate foil was prepared by extrusion coating ethylene acrylic acid (Nucrel 0910HS) a tie layer (Bynel 3860) and EVOH (Egan ECG156B, new EVOH) onto a 0.001 inch foil layer at 24 pounds per ream, at 30 pounds per ream and at 45 pounds per ream.

Table 7 shows the peel strength of Examples 5–8 under sealing conditions of 400° F., a dwell time of three seconds and a sealing bar pressure of 40 psi. The samples were aged for 72 hours at room temperature after sealing and then were conditioned at 120° F. and about 83 percent relative humidity for 48 hours before being tested. The samples were not allowed to cool before being peel tested. The peel test was conducted using an Instron tensile testing device with a jaw speed of two inches per minute and a jaw separation of two inches pulling on the laminate film. The average (top row) and maximum (bottom row) peel strengths of the Examples are shown in Table 7.

TABLE 7

| Example 5 | Example 6 | Example 7-20# | Example 7-30# | Example 7-40# | Example 8-24# | Example 8-30# | Example 8-45# |
| --- | --- | --- | --- | --- | --- | --- | --- |
| 3.540 (Delam) | 5.955 (Delam) | 2.076 (Delam) | 4.375 peeled/ structural failure* | 4.700 structural failure | 2.171 structural failure | 1.483 structural failure | 7.022 structural failure |
| 6.029 (Delam) | 7.578 (Delam) | 8.495 structural failure | 7.441 peeled/ structural failure | 12.283 structural failure | 8.561 structural failure | 10.982 structural failure | 11.745 structural failure |

*Structural failure represents the tearing apart of the structure into two or more pieces and is not a delamination between the layers of the structure.

The above examples demonstrate the effectiveness of using an EVOH adhesive layer for sealing a laminate film to glass containers containing foods.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A composite structure comprising glass, an ethylene vinyl alcohol adhesive layer in adhesive contact with said glass, and at least one other layer bonded to the ethylene vinyl alcohol layer wherein said adhesive contact with said glass is formed by heat and pressure.

2. The structure of claim 1, wherein said one other layer is a stock layer selected from the group consisting of a polymeric film, metal foil, cardboard and paper.

3. The structure of claim 2, wherein the stock layer comprises aluminum foil.

4. The structure of claim 2, including a polymer layer bonded between said stock layer and said ethylene vinyl alcohol layer.

5. The structure of claim 4, wherein the polymer layer is a polyolefin.

6. The structure of claim 5, wherein the polyolefin layer is polyethylene.

7. The structure of claim 6, wherein the polyethylene is selected from the group consisting of low density polyethylene, linear low density polyethylene, and high density polyethylene.

8. The structure of claim 4, wherein the polymer layer is selected from ethylene acrylic acid copolymer, polyesters, nylons and rubbers.

9. The structure of claim 2, wherein the stock layer includes printed indicia.

10. The structure of claim 1, wherein said one other layer is a label for a glass container.

11. A method of sealing a film to a glass container comprising the steps of selecting a multi-layer film comprising an outermost ethylene vinyl alcohol layer and at least one other layer, applying said film to the container with the ethylene vinyl alcohol layer in contact with the glass surface of the container and applying heat and pressure to the multi-layer film to seal the film to the glass surface of the container.

12. The method of claim 11, wherein the glass container has a mouth with an annular rim and wherein said film is applied to the rim of the container to seal the mouth of the container.

13. The method of claim 11, wherein the one other layer is a printed layer and including the step of applying the film to the container as a label.

14. A method of sealing a film to a glass container comprising the steps of selecting a film comprising an ethylene vinyl alcohol layer, applying said film to the container with the ethylene vinyl alcohol layer in contact with the glass surface of the container and applying heat and pressure to the film to seal the film to the glass surface of the container.

15. The method of claim 14, wherein the glass container has a mouth with an annular rim and wherein said film is applied to the rim of the container to seal the mouth of the container.

16. The method of claim 14, including another layer adhered to said film, said another layer comprising a printed layer and including the step of applying the film/printed layer to the container as a label.

* * * * *